US008281111B2

(12) United States Patent
Plondke et al.

(10) Patent No.: US 8,281,111 B2
(45) Date of Patent: Oct. 2, 2012

(54) SYSTEM AND METHOD TO EXECUTE A LINEAR FEEDBACK-SHIFT INSTRUCTION

(75) Inventors: Erich Plondke, Austin, TX (US);
Lucian Codrescu, Austin, TX (US);
Remi Gurski, San Diego, CA (US);
Shankar Krithivasan, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 12/236,067

(22) Filed: Sep. 23, 2008

(65) Prior Publication Data

US 2010/0077187 A1    Mar. 25, 2010

(51) Int. Cl.
*G06F 9/305* (2006.01)
(52) U.S. Cl. .................. 712/223; 708/252
(58) Field of Classification Search .......... None
See application file for complete search history.

(56) References Cited

U.S. PATENT DOCUMENTS

| | | | | |
|---|---|---|---|---|
| 4,195,293 A * | 3/1980 | Margolin | ............... | 345/600 |
| 5,230,020 A * | 7/1993 | Hardy et al. | ............... | 713/162 |
| 5,235,686 A * | 8/1993 | Bosshart | ............... | 712/247 |
| 6,195,780 B1 * | 2/2001 | Dravida et al. | ............... | 714/758 |
| 2003/0002677 A1 * | 1/2003 | Dagan et al. | ............... | 380/265 |
| 2004/0120317 A1 * | 6/2004 | Forssell | ............... | 370/394 |
| 2005/0223193 A1 * | 10/2005 | Knowles | ............... | 712/214 |
| 2006/0179281 A1 * | 8/2006 | Jensen et al. | ............... | 712/214 |
| 2007/0067374 A1 | 3/2007 | Iketani et al. | | |
| 2007/0105572 A1 * | 5/2007 | Kim | ............... | 455/466 |
| 2008/0313435 A1 * | 12/2008 | Orion et al. | ............... | 712/217 |

FOREIGN PATENT DOCUMENTS

| | | |
|---|---|---|
| EP | 0260413 | 3/1988 |
| EP | 0750316 | 12/1996 |

OTHER PUBLICATIONS

LFSR (http://homepage.mac.com/afj/lfsr.c as archived by web.archive.org on Jan. 7, 2003), accessed by examiner on Nov. 26, 2010, 2 pages.*
Antonine (Using NAND or NOR gates to make up Circuits); 5 pages, accessed Nov. 26, 2010, archived on Apr. 24, 2005.*
Guang et al. (Analysis of the Design Methods of Word Oriented Linear Feedback Shift Registers); Wuhan University Journal of Natural Sciences; 2008, vol. 13, No. 6, pp. 712-716.*
Zeng et al. (High Efficiency Feedback Shift Register: Sigma-LFSR); Cryptology ePrint Archive, Report 2007/114 (2007), http://eprint.iacr.org/; 13 pages.*

(Continued)

*Primary Examiner* — Keith Vicary
(74) *Attorney, Agent, or Firm* — Peter Michael Kamarchik; Nicholas J. Pauley; Jonathan T. Velasco

(57) ABSTRACT

A system and method to execute a linear feedback-shift instruction is disclosed. In a particular embodiment the method includes executing an instruction at a processor by receiving source data and executing a bitwise logical operation on the source data and on reference data to generate intermediate data. The method further includes determining a parity value of the intermediate data, shifting the source data, and entering the parity value of the intermediate data into a data field of the shifted source data to produce resultant data.

24 Claims, 5 Drawing Sheets

OTHER PUBLICATIONS

Chowdhury et al. (Efficient Software Implementation of Linear Feedback Shift Registers); Indocrypt 2001, LNCS 2247, pp. 297-307, 2001, 11 pages.*

Patterson et al. (Computer Organization and Design: The Hardware/Software Interface); Third edition, 2005; pp. 23, 58, 61.*

International Search Report—PCT/US2009/057453, International Search Authority—European Patent Office Mar. 12, 2010.

Written Opinion—PCT/US2009/057453. International Search Authority—European Patent Office Mar. 12, 2010.

* cited by examiner

SYSTEM AND METHOD TO EXECUTE A LINEAR FEEDBACK-SHIFT INSTRUCTION

I. FIELD

The present disclosure is generally related to systems and methods to execute a linear feedback-shift instruction.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application that can be used to access the Internet. As such, these wireless telephones can include significant computing capabilities.

In transmitting data to and from a wireless telephone, computed quantities such as cyclic redundancy check (CRC) can be helpful in verifying data integrity. Calculation of quantities such as cyclic redundancy check (CRC) can involve multiple arithmetic instructions that can be processing time-intensive. In order to perform such calculations in a time efficient manner, dedicated hardware may be employed. However, such dedicated hardware may be expensive, and may consume additional power. It would be advantageous to be able to calculate quantities such as CRC in a time-efficient and energy-efficient manner using existing processing hardware.

III. SUMMARY

A method of processing data is disclosed. Resultant data may be determined by performing a logical bitwise operation on input data and reference data producing intermediate data, determining a parity value of the intermediate data, and forming the resultant data from the parity value and selected data bits of the source data. The resultant data may exhibit useful properties. In a particular example, the resultant data may be used to create pseudorandom number sequences. In another particular example, the resultant data can facilitate computation of some error detecting codes, such as a cyclic redundancy check (CRC).

In a particular embodiment, a method of processing data is disclosed. The method includes executing a single linear feedback-shift instruction at a processor. The method includes receiving source data, executing a bitwise logical operation on the source data and reference data to generate intermediate data, determining a parity of the intermediate data, shifting the source data, and entering a data value corresponding to the parity of the intermediate data into a data field of the shifted source data to produce resultant data. The method further includes outputting the resultant data.

In another particular embodiment, a system is disclosed. The system includes a processor to execute a single linear feedback-shift instruction. The system includes a source register operative to provide source data and a reference register operative to provide reference data. The system further includes an execution unit operative to perform a bitwise logical operation on the source data and the reference data to generate intermediate data, to determine a parity of the intermediate data, to shift the source data after executing the bitwise logical operation to produce shifted source data, to enter a data value corresponding to the parity of the intermediate data into a data field of the shifted source data to produce resultant data, and to output the resultant data.

In another particular embodiment, a computer readable medium is disclosed. The computer readable medium stores an executable linear feedback-shift instruction that when executed, causes a processor to receive source data, perform a bitwise logical operation on the source data and on reference data to generate intermediate data, determine a parity of the intermediate data, shift the source data to produce shifted source data, and enter a data value corresponding to the parity of the intermediate data into a data field of the shifted first data to produce a result.

In another particular embodiment, a processor instruction that is executable by a processor is disclosed. The processor instruction includes an instruction name, a first field to identify source data, and a second field to identify reference data. During execution of the processor instruction the processor performs a bitwise logical operation on the source data and the reference data to generate intermediate data, determines a parity of the intermediate data, shifts the source data, and enters a data value corresponding to the parity of the intermediate data into a data field of the shifted source data to produce a result.

In another particular embodiment, a processor is disclosed. The processor includes logic circuitry to perform a bitwise logical operation on source data and on reference data to generate intermediate data, parity circuitry to determine a parity of the intermediate data, bit shifter circuitry to shift the source data, placement circuitry to place a data value corresponding to the parity of the intermediate data into the shifted source data to produce resultant data, and means for outputting the resultant data.

One particular advantage provided by at least one of the disclosed embodiments of the system and method to provide a linear feedback-shift instruction is increased time efficiency by executing multiple steps of the linear feedback-shift instruction in parallel or in a single instruction. An advantage in executing the linear feedback-shift instruction as a single instruction executed by an interleaved multithreaded processor is that substantially no additional latency is introduced during execution since the interleaved multithreaded processor allows for a relatively long execution pipeline that accommodates complex arithmetic instructions.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
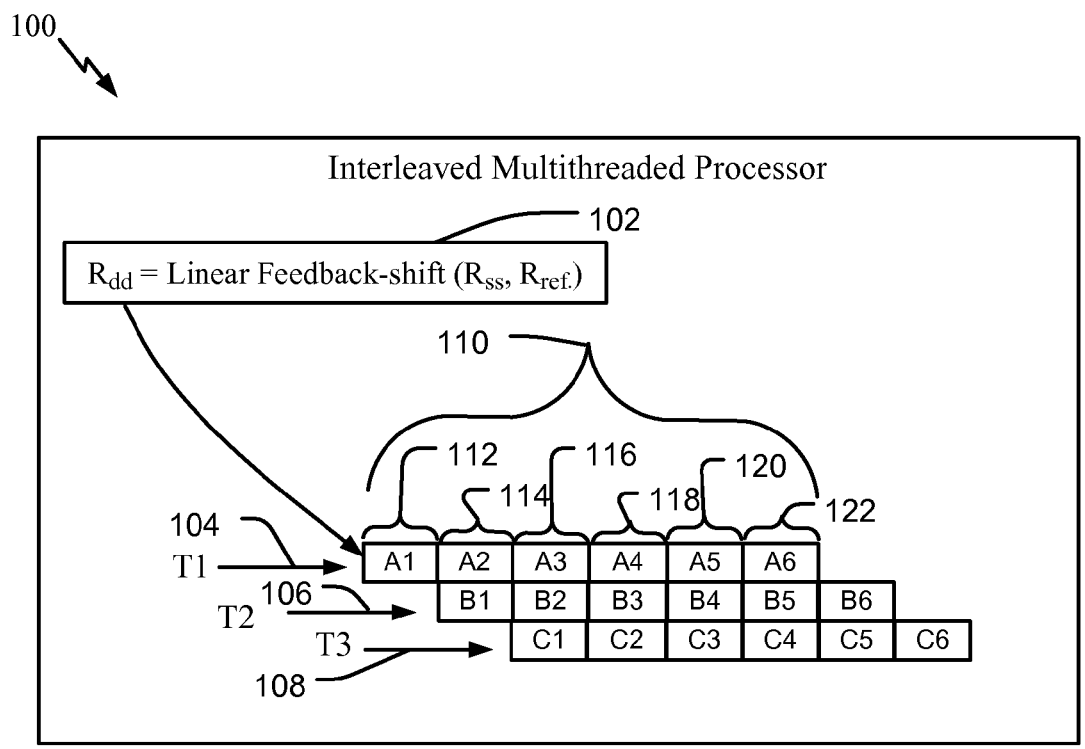
FIG. 1 is a block diagram of a particular illustrative embodiment of an interleaved multithreaded processor configured to execute a linear feedback-shift instruction.

Referring to FIG. 1, a block diagram of a particular illustrative embodiment of an interleaved multithreaded processor configured to execute a linear feedback-shift instruction is depicted and generally designated 100. The interleaved multithreaded processor 100 may execute instructions via a plurality of threads, such as a first thread 104, a second thread 106, and a third thread 108. Each thread 104, 106, and 108 may include a plurality of pipeline stages that are executed within an execution cycle 110, also known as a thread cycle. In a particular illustrative example shown, each of the threads 104, 106, and 108 includes six pipeline stages in the thread cycle. For example, the first pipeline stage $A_1$ 112 may be a fetch stage that fetches an instruction to be processed. The second pipeline stage $A_2$ 114 may be a decoding stage that decodes the fetched instruction. Pipeline stages $A_3$ 116, $A_4$ 118, and $A_5$ 120 may be execution stages. Pipeline stage $A_6$ 122 may be a writeback stage. Each of the threads 104, 106, and 108 of the multithreaded processor 100 may have similar pipeline stages, enabling concurrent processing of a plurality of fetched instructions.

In a particular illustrative embodiment, a linear feedback-shift instruction 102 may be fetched by the interleaved multithreaded processor 100 to be processed in the first thread 104. The linear feedback-shift instruction 102 is a single instruction that can be processed in an interleaved fashion concurrently with execution of other instructions in other threads of the multithreaded processor 100, thus taking advantage of processor computing efficiency.

Figure 2:
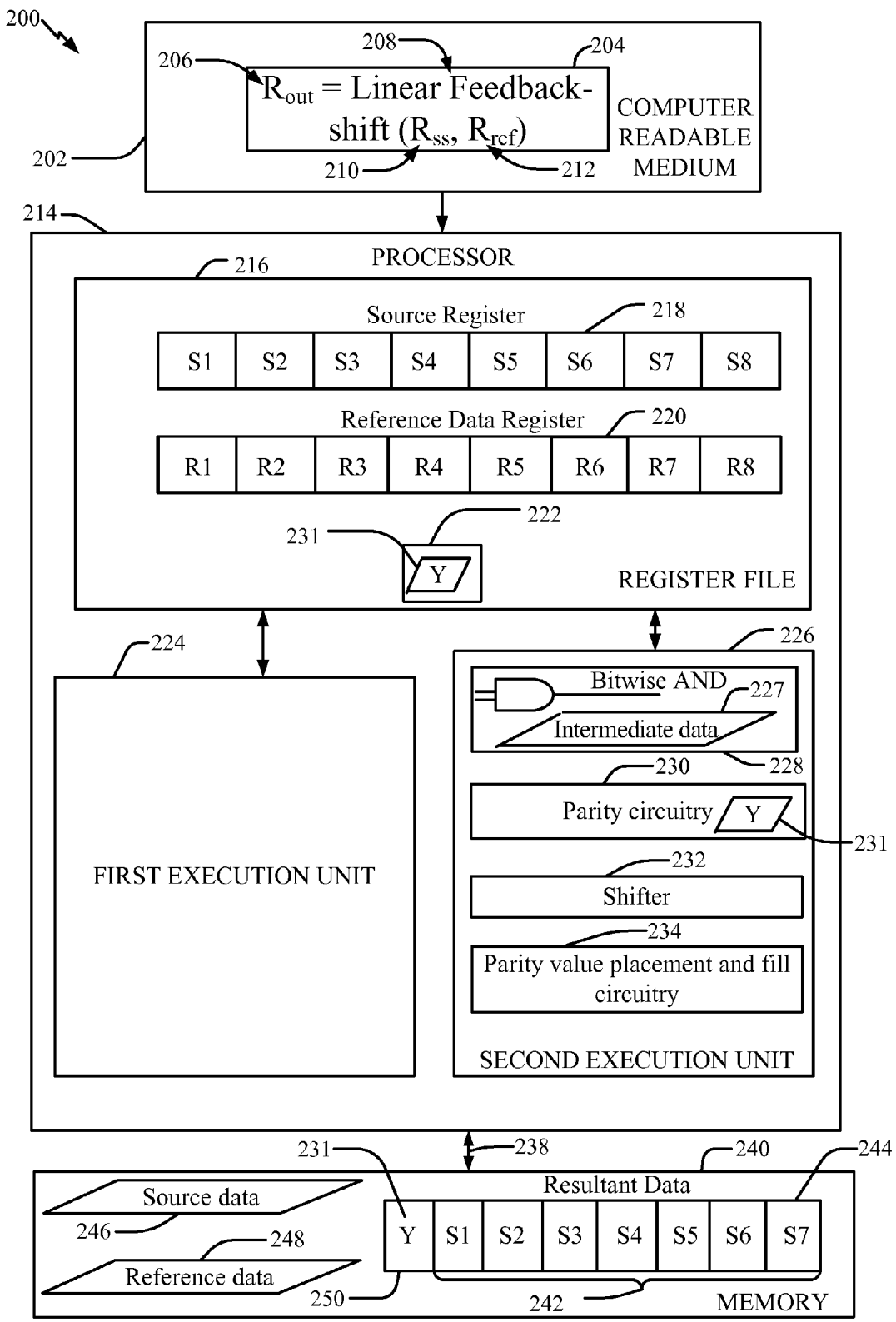
FIG. 2 is a block diagram of a particular illustrative embodiment of a processor configured to process an instruction to perform a linear feedback-shift instruction.

Referring to FIG. 2, a block diagram of a particular illustrative embodiment of a system 200 that includes a processor 214 configured to execute an instruction to perform a linear feedback-shift instruction. For example, the processor 214 may be a pipelined processor. The processor 214 includes a register file 216 coupled to a first execution unit 224 and a second execution unit 226. The second execution unit 226 includes bitwise AND circuitry 228, parity circuitry 230, a shifter 232, and parity value placement and fill circuitry 234. Output from the second execution unit 226 may be input to a register in the register file 216. For example, a result of a parity calculation may be input to a parity register 222. While two execution units 224, 226 are shown in FIG. 2 for ease of illustration, the processor 214 may include more than two execution units.

The processor 214 is adapted to fetch a linear feedback-shift instruction 204 from a computer readable medium 202 such as an instruction cache or a register. The processor 214 may output a result of a computation to a memory 240, where the result may be stored. The processor 214 may use an output means, such as an output bus 238, for outputting the computed result from the processor 214 to the memory 240. In another illustrative embodiment, another means for outputting data from the processor 214 may be employed.

The linear feedback-shift instruction 204 may include an instruction name 208, a first field that identifies source data ($R_{ss}$) 210, a second field that identifies reference data ($R_{ref}$) 212, and may produce output data ($R_{out}$) 206. The linear feedback-shift instruction 204, when executed, may cause a computer to perform a bitwise AND of the source data ($R_{ss}$) 210 and the reference data ($R_{ref}$) 212 to produce intermediate data, determine a parity value (Y) of the intermediate data, shift the source data, and insert the parity value (Y) into a vacated data field to produce the output data ($R_{out}$) 206. The output data ($R_{out}$) 206 may be written to memory as resultant data 244 within the memory 240. The resultant data 244 may be pseudorandom data, Cyclic Redundancy Check (CRC) data, or another type of data. In a particular illustrative embodiment, pseudorandom data is used in cryptographic encoding or decoding. In another particular illustrative embodiment, pseudorandom data is used in statistical applications. In a particular illustrative embodiment, CRC data can be used as a checksum to detect alteration of data or errors during data transmission or data storage.

In operation, the processor 214 may fetch the linear feedback-shift instruction 204 from the computer readable medium 202. The processor 214 may retrieve the source data 246 identified by Rss 210 and the reference data 248 identified by Rref 212, from the memory 240. The source data 246 (shown as data bits S1-S8) may be placed in the source register 218 and the reference data 248 (shown as data bits R1-R8) may be placed in the reference data register 220 of the register file 216.

In a particular illustrative embodiment, the processor 214 executes the single linear feedback-shift instruction 204 as a single instruction in a pipelined processor as follows: the bitwise AND circuitry 228 performs a bitwise AND of contents of the source register 218 with contents of the reference data register 220 to produce intermediate data 227. The processor 214 determines a parity value (Y) 231 of the intermediate data 227 via the parity circuitry 230. The parity value (Y) 231 is a data value corresponding to the parity of the intermediate data 227. The parity value (Y) 231 determined by the parity circuitry 230 is temporarily stored in the parity register 222. The processor 214 right-shifts the source data from the source register 218 by one bit and drops a Least Significant Bit, using the shifter 232. The processor 214 enters the parity value (Y) 231 into a Most Significant Bit (MSB) field 250 through the parity value placement and fill circuitry 234. The processor 214 outputs the output data (Rout) 206 via the output bus 238, stored as resultant data 244 in the memory 240. The resultant data 244 includes right shifted source data 242 and the parity value (Y) 231 that has been placed in the MSB field 250 that was vacated as a result of right-shifting the source data. In a particular illustrative embodiment, the resultant data 244 includes pseudo-random data. For example, the pseudorandom data may be one of a sequence of numbers that approximates the properties of random numbers. Pseudorandom numbers may be used in cryptographic encoding or decoding or in statistical applications. In another particular illustrative embodiment, the resultant data 244 includes CRC data. For example, the CRC data can be used as a checksum to detect alteration of data or errors during data transmission or data storage.

An advantage to executing the linear feedback shift instruction 204 as a single instruction in an interleaved multi-threaded processor, such as the processor 214, is that the processor typically enables complex arithmetic operations to be executed in a single instruction without introducing additional computing overhead as a result of a relatively long execution pipeline. Consequently, by using an interleaved multi-threaded processor, no additional latency is introduced in processor execution time as a result of executing multiple operations of the linear feedback shift instruction 204 in a single instruction.

In a particular illustrative embodiment, the linear feedback-shift instruction 204 may be iterated a plurality of times before outputting the output data ($R_{out}$) 206 and storing as the resultant data 244. In a particular illustrative example, a second iteration is executed beginning with output data 206 that is generated during a first iteration and that may be temporarily stored in the source data register 218, executing a bitwise AND operation with the reference data 248 to produce intermediate data 227 for the second iteration, determining the parity (Y) 231 of the intermediate data 227, right shifting the current contents of the source data register 218 to vacate the MSB field, and backfilling the vacated MSB field with the parity (Y) 231, producing output $R_{out}$ 206 for the second iteration. The above iteration process may be repeated multiple times.

In a particular illustrative embodiment, the processor 214 is an interleaved multi-threaded processor, such as illustrated in FIG. 1. The processor 214 may have a processor thread cycle and may be configured to input source data, generate intermediate data, determine a parity value of the intermediate data, shift the source data, and produce resultant data, executing all of these steps during a processing time period not to exceed the processor thread cycle. As will be discussed in relation to FIG. 5, a wireless transceiver may be coupled to provide wireless data to the processor 214. In a particular illustrative embodiment, the wireless data may be the source data 246 and/or the reference data 248, and the wireless transceiver may be coupled to receive wireless data via an antenna.

Figure 3:
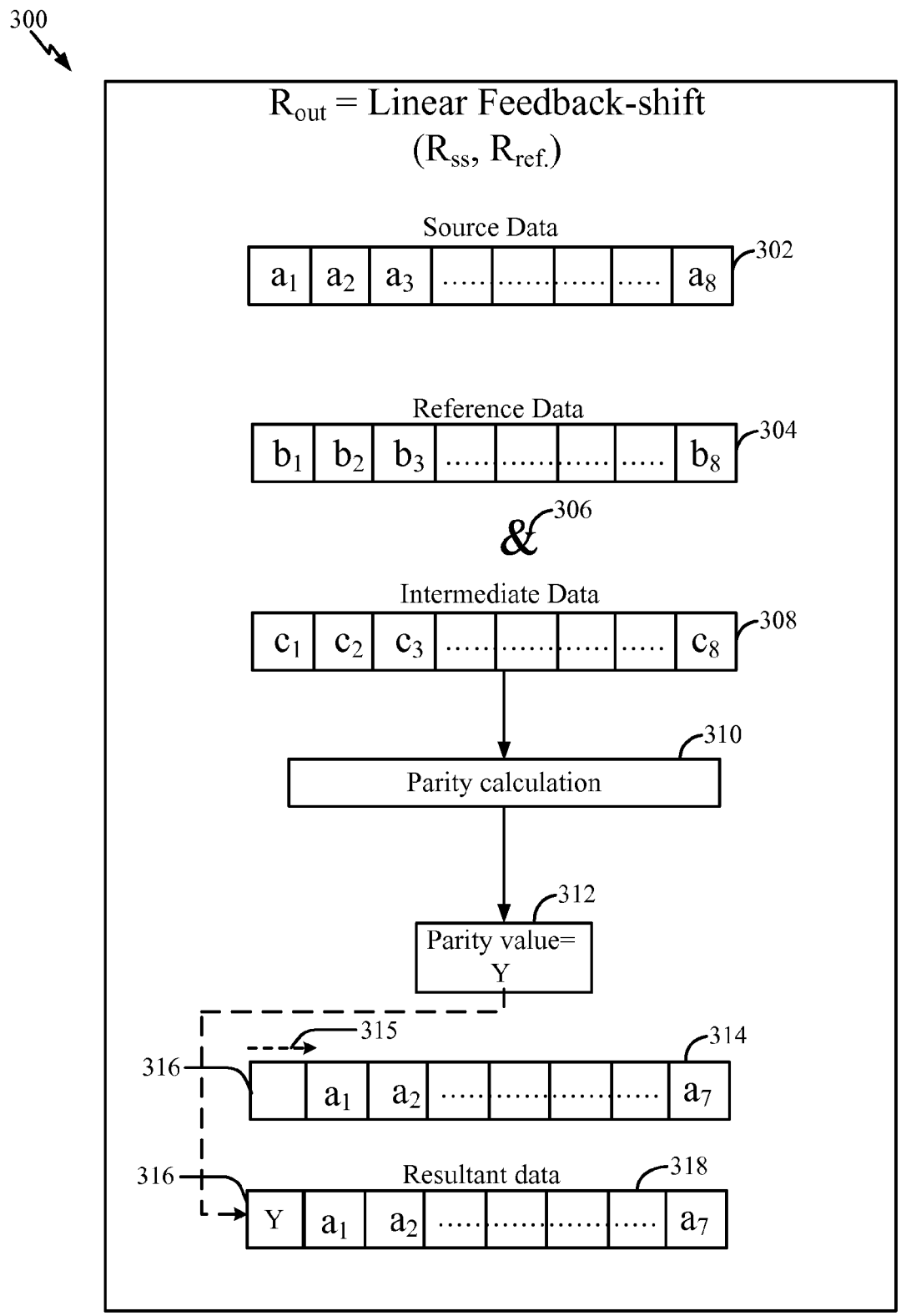
FIG. 3 is a data flow diagram of a particular illustrative embodiment of a linear feedback-shift instruction.

Referring to FIG. 3, a data flow diagram of a particular illustrative embodiment of a method of executing a linear feedback-shift instruction implemented as a single instruction in a pipelined processor is shown and generally designated 300. In a particular example, the method 300 may be implemented by the processor 214 depicted in FIG. 2. The method 300 includes executing a bitwise AND operation 306 on source data 302 and reference data 304 to produce intermediate data 308. The source data 302 may include a plurality of data bits. In an illustrative example, the source data includes data bits $a_1$-$a_8$. The reference data 304 includes the same number of data bits as the source data 302. In an illustrative example, the reference data includes data bits $b_1$-$b_8$. In an illustrative example, the intermediate data includes data bits $c_1$-$c_8$. The source data 302 and the reference data 304 may be provided from registers or from computer memory, and may be received via a wireless transceiver that may be coupled to receive wireless data via a wireless antenna. In another particular illustrative embodiment (not shown), a NAND operation may be performed instead of the bitwise AND operation 306.

After calculating the intermediate data 308, a parity calculation 310 is carried out, yielding a parity value (Y) 312, which is a value corresponding to a parity of the intermediate data 308. The parity calculation 310 includes determining an arithmetic sum of data bit values of the intermediate data 308 and assigning the parity value (Y) 312 a logical one value when the arithmetic sum is an odd number and a logical zero value when the arithmetic sum is an even number.

The data flow diagram 300 of the method of executing the linear feedback-shift instruction implemented as a single instruction in a pipelined processor, such as the interleaved multithreaded processor 100 of FIG. 1, proceeds by executing a shift operation 315 on the source data 302 such as via the shifter 232 depicted in FIG. 2, yielding shifted source data 314 and vacating a data field 316 of the source data 302. The parity value (Y) 312 calculated by parity circuitry, such as parity circuitry 222 of FIG. 2, is entered into the data field 316 of the shifted source data 314, the data field 316 having been vacated as a result of the shift operation 315. Resultant data 318 is produced that includes the shifted source data and the parity value (Y) 312, where the parity value (Y) 312 occupies the data field 316. In a particular illustrative embodiment, the shift operation 315 right shifts the source data 302, and the data field 316 is a Most Significant Bit (MSB).

In a particular illustrative embodiment, the method of executing the linear feedback-shift instruction implemented as a single instruction in a pipelined processor may be executed a plurality of times. Each time the linear feedback-shift instruction is invoked, the source data is input from the resultant data output from the previous execution of the linear feedback-shift instruction. Thus, over the course of several iterations, the original source data may be right-shifted a plurality of times, with a currently vacated most significant bit backfilled by a current parity value 312 determined by the most recent parity calculation 310.

Figure 4:
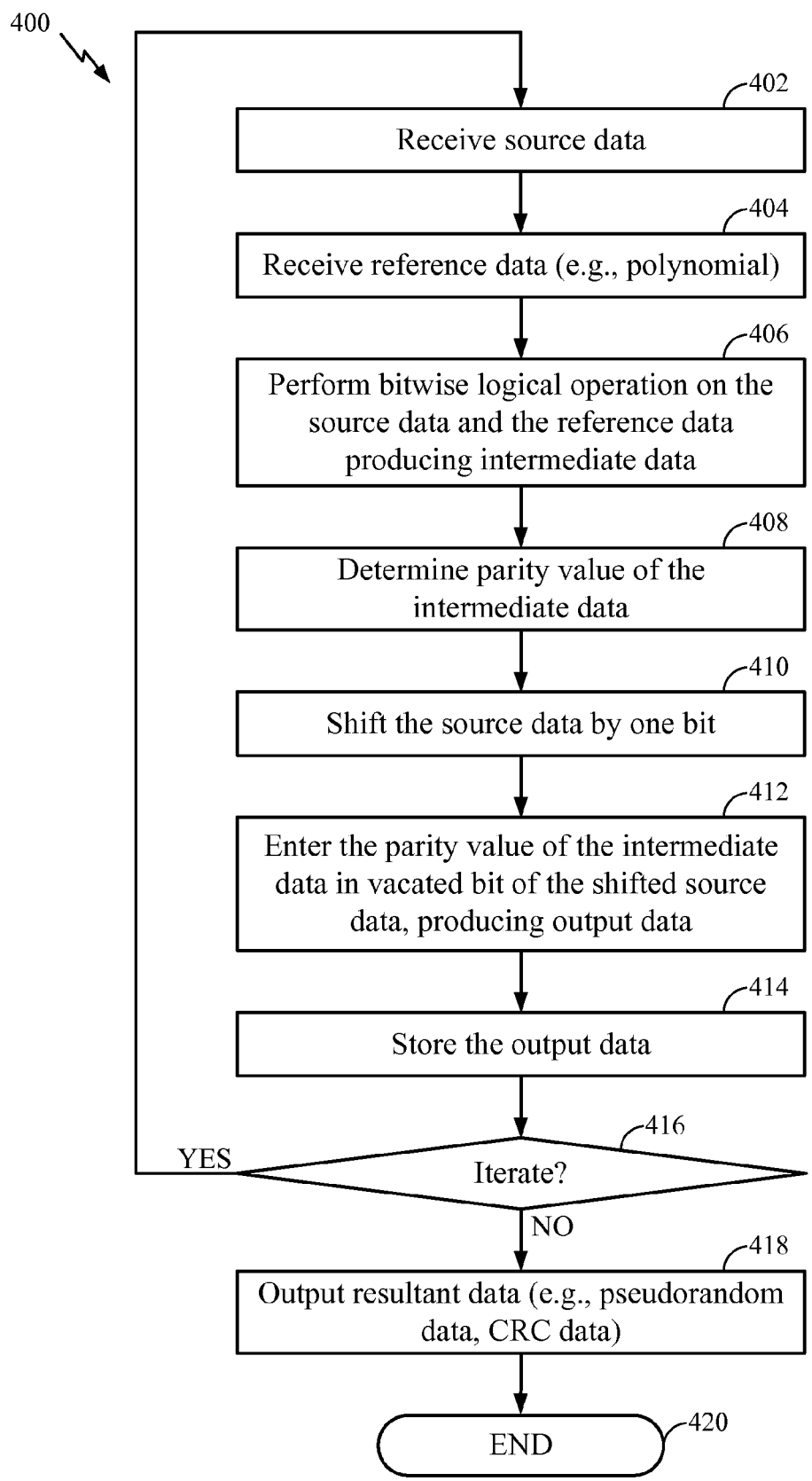
FIG. 4 is a flow chart of a particular illustrative embodiment of a method of executing a linear feedback-shift instruction.

Referring to FIG. 4, a flow chart of another particular illustrative embodiment of a method of executing a linear feedback-shift instruction as a single instruction in a pipelined processor is generally designated 400. At block 402, source data is received. Proceeding to block 404, reference data is received. In a particular illustrative embodiment, the reference data may include polynomial data. Moving on to block 406, a bitwise logical operation, such as an AND or NAND operation, is executed on the source data and the reference data to generate intermediate data. Proceeding to block 408, a parity value of the intermediate data is determined. Advancing to block 410, the source data is shifted by one bit, vacating a bit. In a particular illustrative embodiment, the source data is right-shifted by one bit, vacating a most significant bit (MSB). Proceeding to block 412, the parity value, i.e., a single bit that indicates odd or even parity, of the intermediate data is entered into the vacated bit of the shifted source data, producing resultant data. Moving on to block 414, the resultant data is stored.

Advancing to decision block 416, a determination is made whether to perform another iteration. Where another iteration is performed, the method returns to block 402, where the method again executes the linear feedback shift instruction with the resultant data from the previous iteration of the instruction, performs a bitwise logical operation with reference data to produce current intermediate data, determines a parity value of the current intermediate data, shifts the current intermediate data to produce current shifted intermediate data, enters the parity value of the current intermediate data into the vacated data field of the current shifted data to produce current output data, and stores the current output data. Where another iteration is not to be performed, the method proceeds to block 418 and the output data is output as resultant data. The method terminates at 420. The resultant data is dependent on the received reference data. In a particular illustrative example, the resultant data includes pseudorandom data, which may be used in cryptographic encoding or decoding or in statistical applications. In another particular illustrative example, the resultant data includes CRC data, which can be used in detecting data transmission errors.

Figure 5:
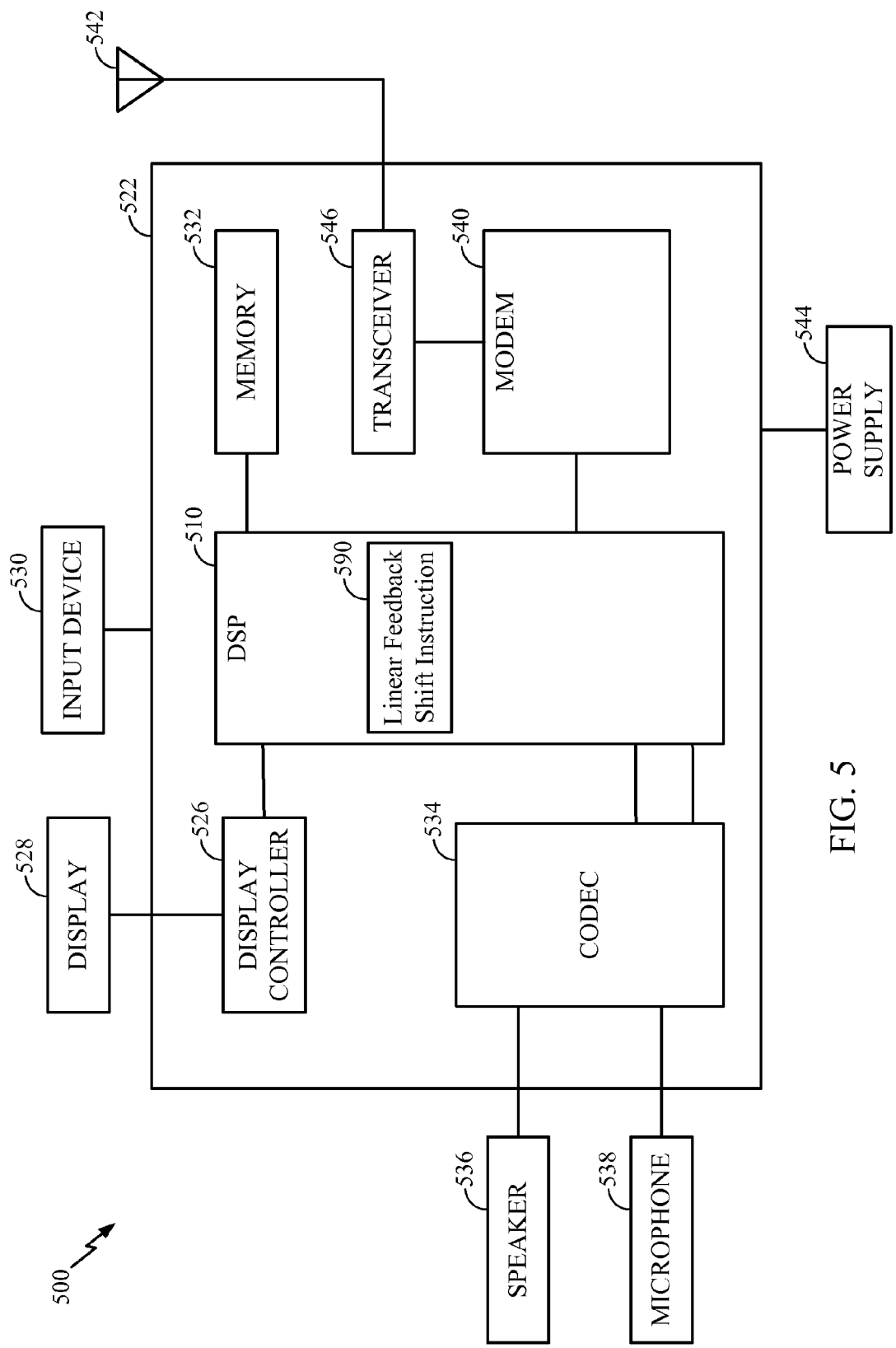
FIG. 5 is a block diagram of a wireless device including a processor configured to perform a linear feedback-shift instruction.

Referring to FIG. 5, a block diagram of a wireless device including a pipelined processor configured to execute a linear feedback-shift instruction as a single instruction is depicted and generally designated 500. The device 500 includes a processor, such as a digital signal processor (DSP) 510 configured to execute a linear feedback-shift instruction 590. The DSP 510 is coupled to a memory 532. In a particular embodiment, the linear feedback-shift instruction 590 is executable at the DSP 510 and the memory 532 and may be implemented using the systems and methods described in reference to FIGS. 1-4 above.

FIG. 5 also shows a display controller 526 that is coupled to the digital signal processor 510 and to a display 528. A coder/decoder (CODEC) 534 can also be coupled to the digital signal processor (DSP) 510. A speaker 536 and a microphone 538 can be coupled to the CODEC 534.

FIG. 5 also indicates that a modem 540 can be coupled to the digital signal processor 510 and to a transceiver 546 that is coupled to a wireless antenna 542. In a particular illustrative embodiment, the transceiver 546 (also "wireless transceiver" herein) may be coupled to receive wireless data via the wireless antenna 542, and the transceiver 546 may be further coupled, via the modem 540, to provide the wireless data to the DSP 510. In a particular embodiment, the DSP 510, the display controller 526, the memory 532, the CODEC 534, and the modem 540 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the wireless antenna 542, and the power supply 544 are external to the system-on-chip device 522. However, each of the display 528, the input device 530, the speaker 536, the microphone 538, the wireless antenna 542, and the power supply 544 can be coupled to a component of the system-on-chip device 522, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
executing a single linear-feedback shift instruction at a processor during a single processor thread cycle of the processor by:
receiving source data from a source register;
executing a bitwise logical operation on the source data and on reference data to generate intermediate data;
determining a parity of the intermediate data;
shifting the source data;
entering a value corresponding to the parity of the intermediate data into a data field of the shifted source data to produce resultant data; and
outputting the resultant data to a first location that is distinct from the source register.

2. The method of claim 1, wherein the bitwise logical operation is an AND operation, and further comprising storing the resultant data at the first location.

3. The method of claim 1, wherein the data field includes the most significant bit (MSB) of the shifted source data.

4. The method of claim 1, wherein the source data is received from a source register based on a field included in the single linear-feedback shift instruction.

5. The method of claim 1, wherein executing the single linear-feedback shift instruction occurs during a single processor thread cycle of the processor and includes:
a decoding stage to decode the single linear-feedback shift instruction;
an execution stage to execute the bitwise logical operation, to determine the parity, and to shift the source data; and
a write back stage to output the resultant data.

6. A system comprising:
a hardware processor comprising:
a source register operative to provide source data;
a reference register operative to provide reference data; and
an execution unit operative to execute a single linear-feedback shift instruction including a first field identifying the source register, wherein execution of the single linear-feedback shift instruction causes the execution unit to:
perform a bitwise logical operation on the source data and on the reference data to generate intermediate data;
determine a parity of the intermediate data;
shift the source data after executing the bitwise logical operation to produce shifted source data;
enter a value corresponding to the parity of the intermediate data into a data field of the shifted source data to produce resultant data; and
output the resultant data.

7. The system of claim 6, wherein the source data is retrieved from the source register based on the first field and the reference data is retrieved from the reference register based on a second field included in the single linear-feedback shift instruction.

8. The system of claim 6, wherein the value corresponding to the parity of the intermediate data is entered into a most significant bit data field of the shifted source data.

9. The system of claim 6, further comprising a wireless transceiver coupled to receive wireless data via an antenna, the wireless transceiver further coupled to provide the wireless data to the source register of the hardware processor.

10. A non-transitory computer readable medium comprising:
a single linear-feedback shift instruction that, when executed by a processor, causes the processor to:
receive source data from a source register;
perform a bitwise logical operation on the source data and on reference data to generate intermediate data;
determine a parity of the intermediate data;
shift the source data to produce shifted source data; enter a value corresponding to the parity of the intermediate data into a data field of the shifted source data to produce a result; and
output the result to a location that is distinct from the source register.

11. The non-transitory computer-readable medium of claim 10, wherein the shift is a right shift, wherein the bitwise logical operation is a single bitwise NAND operation, and wherein the intermediate data is an output of the single bitwise NAND operation.

12. The non-transitory computer-readable medium of claim 10, wherein the value corresponding to the parity of the intermediate data is entered into a vacated position of the shifted source data.

13. A wireless device comprising:
a hardware processor to execute a single linear-feedback shift instruction, wherein during execution of the single linear-feedback shift instruction, the hardware processor:
performs a bitwise logical operation on source data and on reference data to generate intermediate data, wherein the intermediate data is an output of the bitwise logical operation;
determines a parity of the intermediate data;
shifts the source data; and
enters a value corresponding to the parity of the intermediate data into a field of the shifted source data to produce a result; and
wherein the single linear-feedback shift instruction comprises:
an instruction name; and
two fields, wherein the two fields include:
a first field, wherein the first field identifies the source data; and
a second field, wherein the second field identifies the reference data.

14. The wireless device of claim 13, wherein the bitwise logical operation is an AND operation.

15. The wireless device of claim 13, wherein the bitwise logical operation is a NAND operation.

16. The wireless device of claim 13, further comprising:
a memory coupled to the hardware processor;
a display controller coupled to the hardware processor; and
a coder/decoder coupled to the hardware processor.

17. An apparatus comprising:
a hardware processor to execute a single linear-feedback shift instruction, the hardware processor comprising:
logic circuitry to perform a bitwise logical operation on source data and on reference data to generate intermediate data, wherein the source data is received from a source register;
parity circuitry to determine a parity value of the intermediate data;
bit shifter circuitry to shift the source data;
placement circuitry to place the parity value of the intermediate data into the shifted source data to produce resultant data; and
means for outputting the resultant data to a location that is distinct from the source register; and
wherein the logic circuitry, the parity circuitry, the bit shifter circuitry, the placement circuit, and the means for outputting the resultant data are responsive to the single linear-feedback shift instruction.

18. The apparatus of claim 17, wherein the reference data comprises polynomial data.

19. The apparatus of claim 18, wherein the resultant data comprises a cyclic redundancy check value.

20. The apparatus of claim 17, wherein the resultant data comprises pseudorandom data.

21. The apparatus of claim 17, wherein the hardware processor comprises an interleaved multithreaded processor, and wherein the interleaved multithreaded processor processes the single linear feedback-shift instruction concurrently with execution of another instruction by the interleaved multithreaded processor.

22. The apparatus of claim 17, wherein the hardware processor includes a processor thread cycle, and wherein generating the intermediate data, determining the parity value of the intermediate data, shifting the source data, and producing the resultant data are executed responsive to the single linear-feedback shift instruction during a processing time period not to exceed the processor thread cycle.

23. An apparatus comprising:
a source register operative to provide source data;
a reference register operative to provide reference data; and
means for executing a single linear-feedback shift instruction, wherein the means for executing includes:
means for performing a bitwise logical operation on the source data and on the reference data to generate intermediate data;
means for determining a parity of the intermediate data;
means for shifting the source data after executing the bitwise logical operation to produce shifted source data;
means for entering a value corresponding to the parity of the intermediate data into a data field of the shifted source data to produce resultant data; and
means for outputting the resultant data to a location that is distinct from the source register.

24. The apparatus of claim 23, further comprising:
means for receiving wireless data; and
means for providing the wireless data to the source register.

* * * * *